United States Patent
Salter et al.

(10) Patent No.: US 12,367,537 B2
(45) Date of Patent: Jul. 22, 2025

(54) GUIDED HOME SECURITY INSPECTION POLICING SERVICE

(71) Applicant: FORD GLOBAL TECHNOLOGIES, LLC, Dearborn, MI (US)

(72) Inventors: Stuart C. Salter, White Lake, MI (US); Christopher C. Hunt, Livonia, MI (US); Brendan F. Diamond, Grosse Pointe, MI (US); Paul K. Dellock, Northville, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 314 days.

(21) Appl. No.: 18/093,394

(22) Filed: Jan. 5, 2023

(65) Prior Publication Data
US 2024/0233059 A1    Jul. 11, 2024

(51) Int. Cl.
| | |
|---|---|
| G06Q 50/26 | (2024.01) |
| G06Q 10/10 | (2023.01) |
| G06Q 40/08 | (2012.01) |
| H04N 7/18 | (2006.01) |
| H04N 23/60 | (2023.01) |

(52) U.S. Cl.
CPC ............ *G06Q 50/265* (2013.01); *H04N 7/183* (2013.01); *H04N 23/64* (2023.01)

(58) Field of Classification Search
CPC ...... G06Q 50/265; H04N 7/183; H04N 23/64; H04N 7/181; G08B 13/1966; G08B 13/19682; G08B 13/19684
USPC .................................................. 705/1.1–912
See application file for complete search history.

(56) References Cited

U.S. PATENT DOCUMENTS

| | | | |
|---|---|---|---|
| 7,027,955 B2 * | 4/2006 | Markwitz | G07C 1/20 702/187 |
| 8,824,784 B2 * | 9/2014 | Tedesco | G08B 13/19641 709/219 |
| 9,585,056 B2 * | 2/2017 | Suttmann | H04W 48/20 |
| 10,560,668 B2 * | 2/2020 | Araya | H04N 7/181 |
| 10,929,798 B1 * | 2/2021 | Kinney | G06Q 10/06398 |

(Continued)

FOREIGN PATENT DOCUMENTS

| | | | |
|---|---|---|---|
| AU | 2012216428 A1 * | 7/2013 | |
| CN | 113469633 A * | 10/2021 | |

OTHER PUBLICATIONS

CN113469633A—preview and translation (Provided from IP.com) (Year: 2021).*

*Primary Examiner* — Jonathan P Ouellette
(74) *Attorney, Agent, or Firm* — Frank L. Lollo; MacMillan, Sobanski & Todd, LLC

(57) ABSTRACT

An on-demand security inspection system is provided for dispatching an investigator to a target dwelling. The investigator (e.g., a police officer) carries a video camera (e.g., a body cam). The inspection system comprises a service management server, a requestor interface, and an investigator interface. The requestor interface is configured to link a user to the service management server in order to specify a checklist. The investigator interface is configured to link a mobile unit (e.g., a vehicle control module or a handheld mobile unit) to the service management server in order to (1) communicate a plurality of checklist prompts to the mobile unit, and (2) return video data from the video camera captured according to the checklist prompts.

18 Claims, 5 Drawing Sheets

(56) References Cited

U.S. PATENT DOCUMENTS

| | | | |
|---|---|---|---|
| 11,373,495 B2* | 6/2022 | Madden | G07C 9/00658 |
| 2003/0206099 A1* | 11/2003 | Richman | G08B 13/19697 |
| | | | 340/506 |
| 2005/0023347 A1* | 2/2005 | Wetzel | G07C 1/20 |
| | | | 235/385 |
| 2005/0080636 A1* | 4/2005 | Markwitz | G06Q 10/06311 |
| | | | 702/187 |
| 2007/0136077 A1* | 6/2007 | Hammond | G06Q 30/0278 |
| | | | 705/306 |
| 2008/0030364 A1* | 2/2008 | Wu | G08G 1/20 |
| | | | 340/8.1 |
| 2008/0114655 A1* | 5/2008 | Skidmore | G06Q 30/0236 |
| | | | 705/14.36 |
| 2009/0256693 A1* | 10/2009 | Brinton | G06Q 10/06 |
| | | | 340/439 |
| 2011/0291851 A1 | 12/2011 | Whisenant | |
| 2014/0310188 A1* | 10/2014 | Preuss | G06Q 50/163 |
| | | | 705/314 |
| 2014/0327555 A1 | 11/2014 | Sager et al. | |
| 2015/0193864 A1* | 7/2015 | Allison | G06Q 30/0645 |
| | | | 705/5 |
| 2016/0065658 A1* | 3/2016 | Alon | G06Q 10/063116 |
| | | | 709/204 |
| 2017/0243080 A1* | 8/2017 | Chriss | H04N 7/185 |
| 2020/0177849 A1 | 6/2020 | Shimada et al. | |
| 2020/0265364 A1* | 8/2020 | Parham | G06Q 50/265 |
| 2023/0379430 A1* | 11/2023 | Han | H04N 23/667 |
| 2024/0133708 A1* | 4/2024 | Messia | G06Q 50/26 |

\* cited by examiner

GUIDED HOME SECURITY INSPECTION POLICING SERVICE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to services for checking home/building security during times when an owner/occupant is away, and, more specifically, to an automated guidance system configurable remotely activate video monitoring and to provide a checklist of items for checking during an inspection.

Law enforcement agencies (e.g., police departments) of many cities and towns (as well as private security providers) offer a service known as a "Vacation Check" which involves investigators (e.g., officers) performing an in-person investigation at a residence or other dwelling. As used herein, a dwelling may include a home, garage, office building, business facility, or the like. During a check, the officer may walk or drive around a building perimeter looking for signs of unlawful entry, foul play, unlocked doors/windows, or anything else that may be wrong. Such vacation checks may be requested by a user (e.g., homeowner) who expects be away from the dwelling for an extended period of time.

When a request for a Vacation Check is filed with law enforcement, providing a location (e.g., street address) is required. Optionally, details about the desired areas to be checked may also be identified. Any such additional details are presented verbatim to the officer who may have to refer to the full list of areas repeatedly while haphazardly moving from one area to another. Because feedback from the officer providing any details about each individual area are time consuming to collect and record, the results of a check usually are limited to either a notification that all is okay or a notification of potential problems. During known checks, any video imagers such as an officer's body-worn sensor suite (e.g., camera and microphone) or a vehicle-mounted camera have typically not been utilized.

Existing body cameras typically include a programmable controller with the camera and microphone, as well as a GPS receiver. This enables various advanced functions such as audio algorithms to enhance speech recording, to start recording on gunshot detection or in response to spoken/audio prompts, or to add video markers of important events in response to touching of the unit. Because body cams need to be small, issues arise concerning battery life needed to record video and audio data and to upload the data (e.g., directly to the cloud).

In many situations, body cameras may have to be turned on and off manually which is cumbersome. A body camera may run an entire shift, resulting in excessive battery consumption as well as very large data files which have to be stored and then scanned through to find any events of interest. There are existing software packages to work with body camera video (e.g., a Digital Evidence Management System or DEMS) which allows users to generate reports, cloak files based on defined user levels and searches, and create and customize an unlimited number of retention policies—but these all require human intervention and stretch the resources of the law enforcement agencies.

It would be desirable to efficiently organize vacation checks and to guide an officer in an efficient manner to ensure important dwelling features are checked within a minimal amount of time. It would also be desirable to include video monitoring (e.g., a body-worn camera) optimized for wireless data links having various data rates and in a manner that avoids compromising camera power reserves or requiring human intervention in archiving the data.

SUMMARY OF THE INVENTION

The present invention provides a connected police home security vacation check service which coordinates police visits to a target property while the owner/occupant is away in a manner which leverages the available vehicle and body-worn sensors. Using predefined checklists regarding items to investigate, real time communication, and video recording provides the user with peace of mind while away for extended periods of time.

The sensors (e.g., body cam and vehicle on-board camera) can be linked to a remote interface for the Vacation Check so that a user is able to see and/or hear the inspection takes place and/or review it later. The invention packages a video record of the visit and keeps the body cam power consumption low to ensure there is sufficient power to record other critical events throughout the officer's day.

In one aspect of the invention, an on-demand security inspection system is provided for dispatching an investigator to a target dwelling. The investigator (e.g., a police officer) carries a video camera (e.g., a body cam). The inspection system comprises a service management server, a requestor interface, and an investigator interface. The requestor interface is configured to link a user to the service management server in order to specify a checklist. The investigator interface is configured to link a mobile unit (e.g., a vehicle control module or a handheld mobile unit) to the service management server in order to (1) communicate a plurality of checklist prompts to the mobile unit, and (2) return video data from the video camera captured according to the checklist prompts.

DETAILED DESCRIPTION OF PREFERRED EMBODIMENTS

Figure 1:
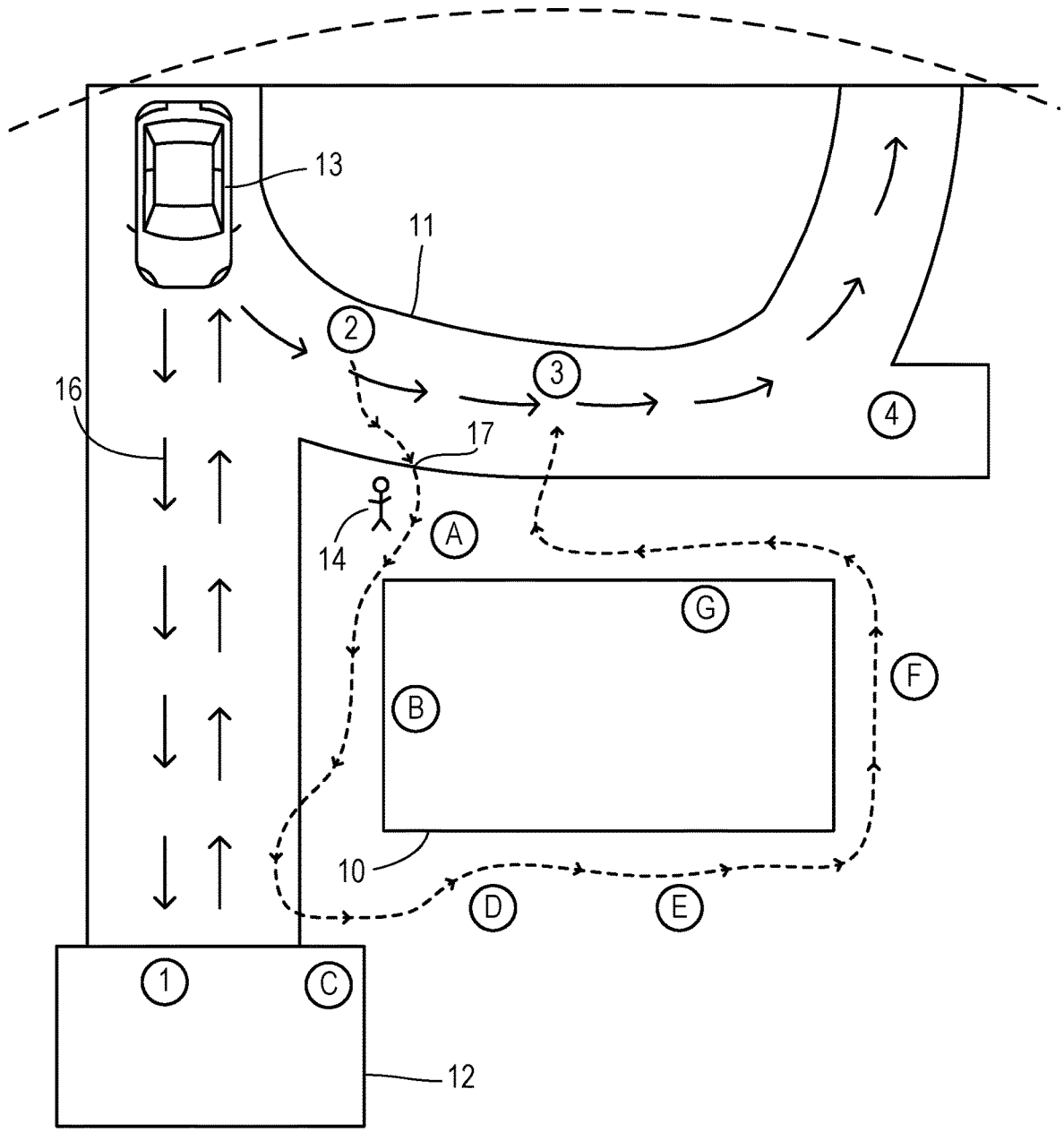
FIG. 1 is a schematic diagram showing a serial checklist mapped according to a target dwelling to be inspected.

In an example embodiment, a homeowner initiates a "Vacation Check" for their home with their local Police Department by providing their address, dates/times they will be gone, how frequently they would like their house to be checked, and possibly scheduling specific times for inspections. The requests can be initiated via direct contact with the Police Department (e.g., phone), an Internet browser-based form accessed with a computer or with a touchscreen interface in a user's car, or a smartphone app. A checklist of inspection items and associated instructions or comments can also be specified by the user. The requests can be assigned to specific patrol officer (and their patrol vehicle) using a service management server of a security inspection system. Creation of a checklist may include specifying the house layout (e.g., locations of door and windows to be checked) via a house map showing these critical locations. The checklist may include pictures and/or text for easy identification. Critical locations to be checked may include back entrances, parked vehicles in the driveway, windows, or detached garages.

In some embodiments, the user can remotely enable building access so that the investigator (e.g., police officer) can enter the home check for damage or determine if a stove or water supply has been left on. For example, the user can program a special temporary access code to the home which is given to the police, or the user can remotely unlock a door via a smartphone app or other mechanism.

When the scheduled check is to occur, the service management system may communicate relevant information (e.g., home address and checklist) to a control module in the police vehicle via V2I communication. Certain information about the Vacation Check such as the checklist itself and the navigation route to be followed to reach the target dwelling may be communicated to the police officer via a touchscreen display (e.g., on an officer's smartphone or an infotainment screen on a vehicle instrument panel). If an address but no specific checklist is provided, then the service management server may be able to acquire blueprints of the home in order to identify key locations where the officer should investigate such as ground floor doors and windows. The checklist is preferably scripted in a chronological order to reduce the time needed to check the dwelling or its surroundings. Using GPS coordinates, the body cam can identify which checklist item the officer is at or is approaching, and then it waits to detect an oral command to resolve the current item. Separate checklists for the vehicle and for the officer can be created so that both are checking different items in parallel. For example, upon arriving the police vehicle can use its exterior sensor suite to scan or identify other items that should be added to the officer's checklist such as vehicles on the property or patio furniture.

The checklist can include information concerning many doors to check, which doors to check, where they are located on the property. The user can also specify locations to place mail or packages and can momentarily grant access to the officer/investigator for entering the dwelling to place packages inside.

In some preferred embodiments, the invention automates various features of the Vacation Check. It provides a packaged video record of the check, and it uses the video record to perform comparisons of image data for specific locations taken during the current inspection and a previous appearance of the specific location based on artificial intelligence (AI) and machine learning (ML). The service management server (e.g., located at the station) can communicate relevant information via V2I to a control module in the police vehicle such as the home address and checklist(s). The vehicle control module can then communicate relevant information about the Vacation Check (e.g., the checklist, route navigation, etc.). to the police officer via their mobile device (smartphone). Interaction between the service management server and the vehicle controller automatically triggers the initiation of video/audio packaging (e.g., turning on the camera and microphone and storing or streaming the resulting data). Thus, as soon as the vehicle enters into a geofenced area containing the target dwelling, both the vehicle-mounted imager and officer's body camera/microphones will turn on and start recording. These recordings can be made available real-time to the user (e.g., homeowner) to facilitate real-time interaction if needed. The recordings may also be recorded and automatically packaged (e.g., formatted with metadata and the responses logged by the officer) for future reference.

The invention enables the officer, the officer's body cam, the vehicle controller, and the vehicle sensors to automatically work together. As the officer inspects an area (specific checklist location) as directed by a checklist prompt shown on their display, the officer can interact with their body cam or smartphone (using touch inputs or speech) to either mark a location secure as "no issue" or generate a notice of a security issue. Then the officer and checklist can continue onto the next inspection site or item. At the same time, the police vehicle may autonomously drive around and inspect the dwelling from the driveway, parking lot, or accessible off-road areas.

As the officer encounters unusual conditions or issues (which may be recognized using AI and/or ML), the user may be pinged and/or an incident report may be generated to document damage, document a potential crime, or initiate repair services if needed. The patrol officer(s) may also coordinate the dispatch of a crime scene inspection unit or other backup. Using a wireless connection between the vehicle controller and the officer's body cam or smartphone, the vehicle controller may download to at least one officer-held device each step in the checklist along with still pictures of the specific locations to be checked. Real-time comparison by the officer of the still pictures with the current scene can help detect differences or damage (e.g., paint discolorations, dents, or broken windows). A Bluetooth® or Wi-Fi link may be provided between the vehicle controller and the officer's device(s). The vehicle controller (which has more CPU and electrical power) can also perform the comparison using a current image once the officer returns to the vehicle.

Completion of the checklist triggers deactivation of the body cam and a final packaging of the video/audio data. Upon leaving the geofenced area of the target dwelling, the data may first be downloaded to the vehicle controller via Bluetooth® or Wi-Fi and then automatically further packaged into a record of an incident report. A notification is preferably sent to the user including video footage from both the vehicle and body cam regarding the checked items, identification of issues or problems, notification of any mail or packages brought into the house, presence of vehicles on the property, and information regarding any noted potential damage.

Bluetooth® bandwidth and range are limited compared to Wi-Fi. Bluetooth® can only send the video at a maximum of 3 Mbps and may lose the connection by 33 ft. It may even get noisy/choppy well before that at around 20 ft. It might get noisy or chopping before all the video is sent. Therefore, if Bluetooth® is the only method available with the officer's camera system, it may be preferred to store video on the officer's device and transfer it once they return to the vehicle. WiFi has more bandwidth and more range. A WiFi connection may support a real-time live link between the vehicle and the officer during the inspection. Data from the active link between to officer and vehicle could then be pushed to the service management server (in the cloud) in real-time via a vehicle TCM Cellular.

FIG. 1 schematically represents a checklist for inspecting a dwelling including a residence 10, a driveway 11, and a detached garage 12, wherein a vehicle-related checklist shown by circled numerals 1 through 4 is performed by a patrol vehicle 13 and an officer-related checklist shown by circled letters A through G is performed by an officer 14. Vehicle 13 follows a path 16 indicated by arrows along driveway 11 to visit item ① at garage 12, items ② and ③ along a front side of residence 10, and item ④ which inspects a parking area where a parked vehicle may be present. The officer-related checklist includes a walking path 17 indicated by dashed arrows which officer 14 follows to visit doors, windows, or other security related items designated A through G according to checklist prompts (which may also include navigation instructions) which are sent to and displayed by a mobile unit (e.g., the officer's smartphone or a vehicle-mounted display in an HMI).

Figure 2:
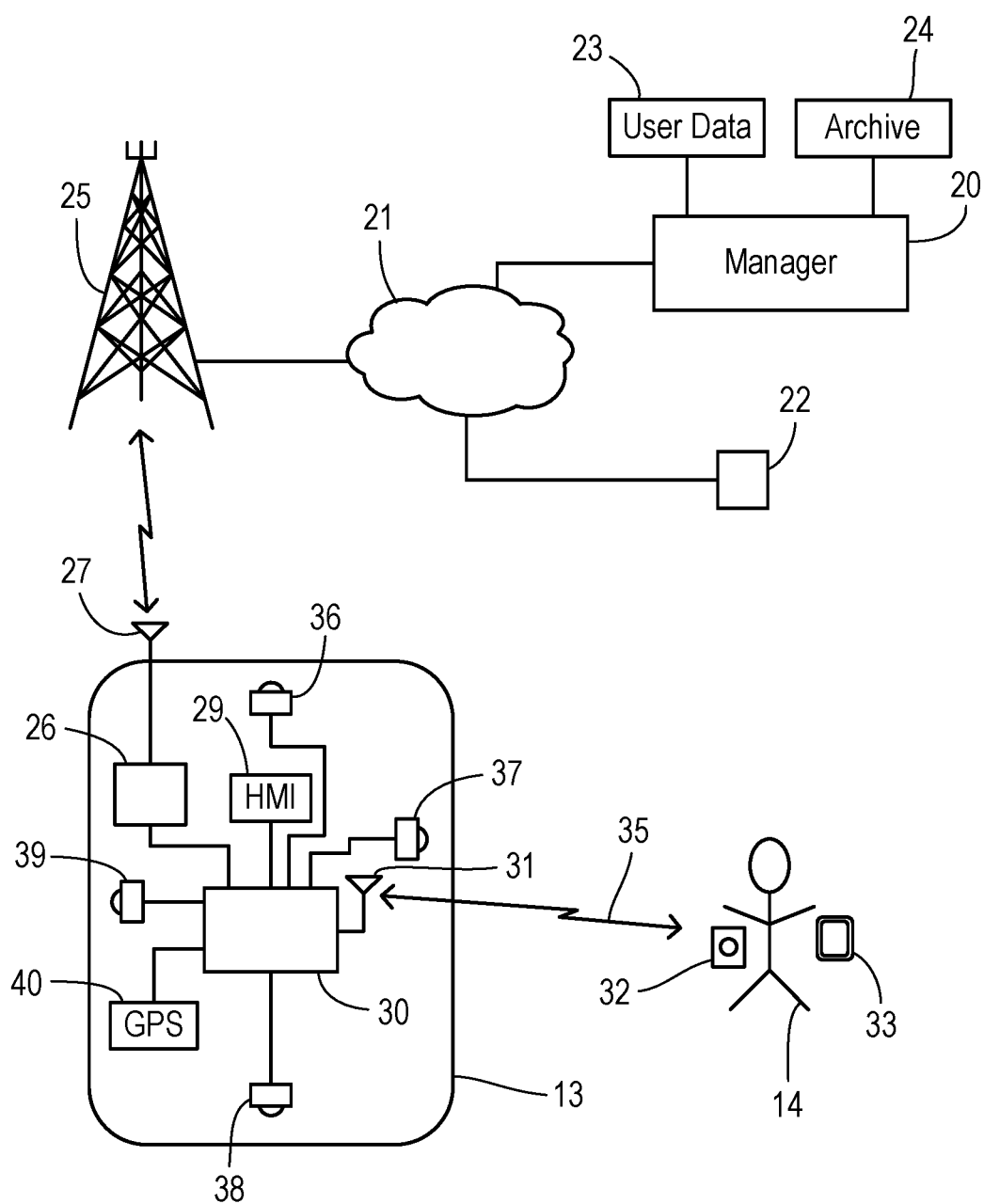
FIG. 2 is a block diagram showing a security inspection system including a dispatched vehicle and dispatch investigator/officer.

FIG. 2 shows a block diagram representing the elements of the on-demand dwelling security inspection system based on a service management server 20 which is accessible in a cloud network 21. Server 20 may be located at a police department or other security or law enforcement agency, or at any other location under the purview of the provider of the inspection service. Server 20 interacts over cloud network 21 with a user 22. A resulting requestor interface to server 20 via network 21 enables user 22 to set up vacation checks. In the set-up process, server 20 configures user data 23 to specify a user-defined checklist and to record the location and requested inspection times. Server 20 is further connected with a data archive 24 which stores inspection results such as video/audio data and inspection feedback or other comments/reports provided by an officer during the vacation checks. Patrol vehicle 13 communicates with server 20 through cloud network 21 and a cellular data connection comprising a cellular network 25 and a telematics module 26 and antenna 27 in vehicle 13.

A vehicle control module 30 maintains a wireless link 35 to mobile devices carried by officer 14 via its antenna 31. The officer's mobile devices include a body cam system 32 and a smart phone 33. Link 35 may include a Wi-Fi connection and/or a Bluetooth connection, for example. Patrol vehicle 13 includes various sensors such as cameras 36-39 which are coupled with controller 30. Patrol vehicle 13 further includes a GPS receiver 40 coupled with controller 30 to monitor geographic coordinates. Body cam system 32 and smart phone 33 may each also include a geolocation function. A human-machine interface (HMI) 29 coupled to control module 30 may include a touchscreen display.

Figure 3:
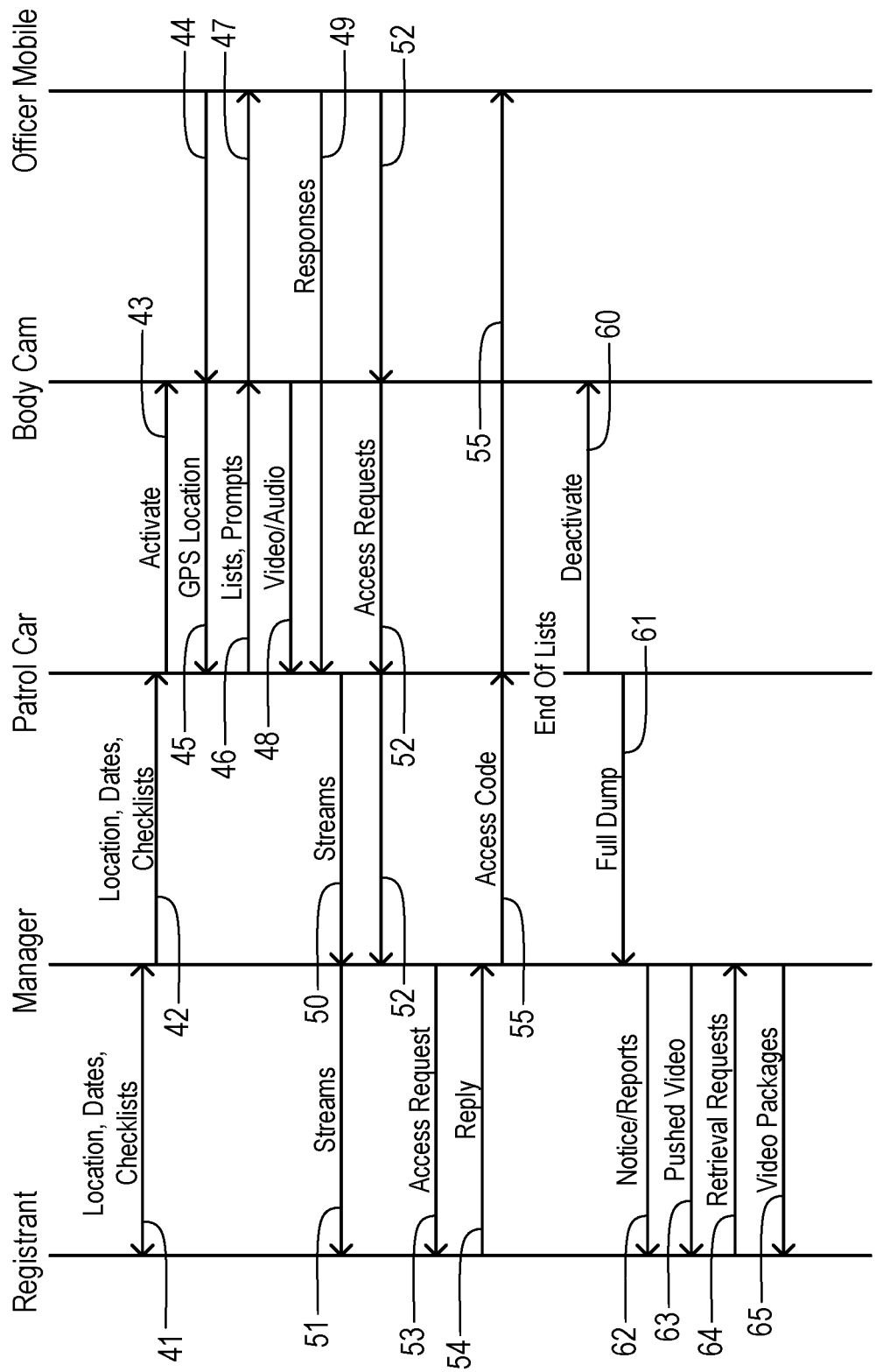
FIG. 3 is a message diagram showing an example sequence of messages among elements of a security inspection system.

FIG. 3 shows an example messaging sequence showing messages exchanged among a user (i.e., registrant), manager (i.e., server), patrol car, officer's body cam, and officer's mobile smartphone. In an initial set of messages 41 between the registrant and the manager, a Vacation Check is set up according to the location to be inspected, one of more investigator checklists of inspection items, and the dates/times when the inspection(s) should be performed. Separate checklists may be generated for performance by the investigator (e.g., items to be hand checked and/or imaged by an office on foot) or by the patrol car (e.g., images to be captured at specific positions and orientations). Other set-up details may include contact information for reaching the user, types of reports being requested (e.g., via email), and whether the user requests live streaming of audio/video during a check.

When the time for a Vacation Check is reached, the manager sends messages 42 to the patrol car (e.g., an onboard controller) in order to dispatch the patrol car and officer(s) to the location and to implement the checklist(s). The details may be presented to the officer(s) using display panels on the vehicle instrument panel or on their smartphone(s) or can be transferred to the onboard controller for automatic execution.

Once the patrol car arrives at the location, the onboard controller sends an activation command 43 is transmitted to the body cam at an appropriate time before a checklist item is invoked which utilizes any functions of the body cam. Thus, a battery usage of the body cam is deferred until it is actually needed. While proceeding through the checklist(s), geographic coordinates (e.g., a GPS location) are obtained by the officer's mobile device and/or body cam for use in automatically detecting movement to specific locations associated with the inspection items, and the coordinates are reported to the patrol car in messages 44 and 45. The full checklists and/or individual prompts for current checklist items are sent from the patrol car to the body cam and mobile device (e.g., smartphone) in messages 46 and 47, respectively. At various times during the Vacation Check (depending on the availability and capacity of the wireless data link), video and/or audio data from the body cam are transmitted to the onboard controller in the patrol car via messages 48.

Response messages 49 generated by the officer (e.g., by selecting predetermined status icons such as a "No Issues" icon or by entering text via a touchscreen) in response to corresponding checklist prompts are sent to the onboard controller for use in generating a report or alerting the user, for example. During or after the performance of the checklists, the captured video/audio data is transmitted from the patrol car to the management server via streams 50. If requested by the user, video/audio streams 51 can be simultaneously (or nearly simultaneously) sent to the user to follow the progress of the Vacation Check.

In the event that the officer conducting an inspection encounters a need to obtain access to a locked area of a target dwelling (e.g., by finding an unusual condition such as a broken window) for which a lock can be unlocked using an access code, they may initiate an access request message 52 from the mobile device, body cam, or an HMI in the patrol car which is relayed by the management server to the user in a message 53. If the user wishes to grant access, then a reply message 54 is sent to the management server including the access code. The access code is then shared with the officer via a message 55.

In a preferred embodiment, checklist prompts are provided to the office one-by-one until the checklist is completed. Once completed (and after any yet to be completed transfer of video/audio data is finished), a deactivation command 60 is transmitted from the onboard controller to the body cam so that the body cam is automatically switched off to preserve battery charge.

If any video/audio data has not yet been transferred from the patrol car to the management server, a final dump of all the video/audio data and any other officer responses or metadata is sent in messages 61. The management server sends a notice and/or any reports to the user via messages 62, and it may push video/audio data via messages 63. For archival, the management server may automatically generate video packages which may include all or selected highlight portions of the captured video and audio together with other predetermined details relating to a Vacation Check. At any subsequent time, the user (or other authorized parties) may submit request messages 64 to the management server for access to the results of a Vacation Check. The management server may retrieve selected video packages 65 for transmission to the user or other authorized requestor.

Figure 4:
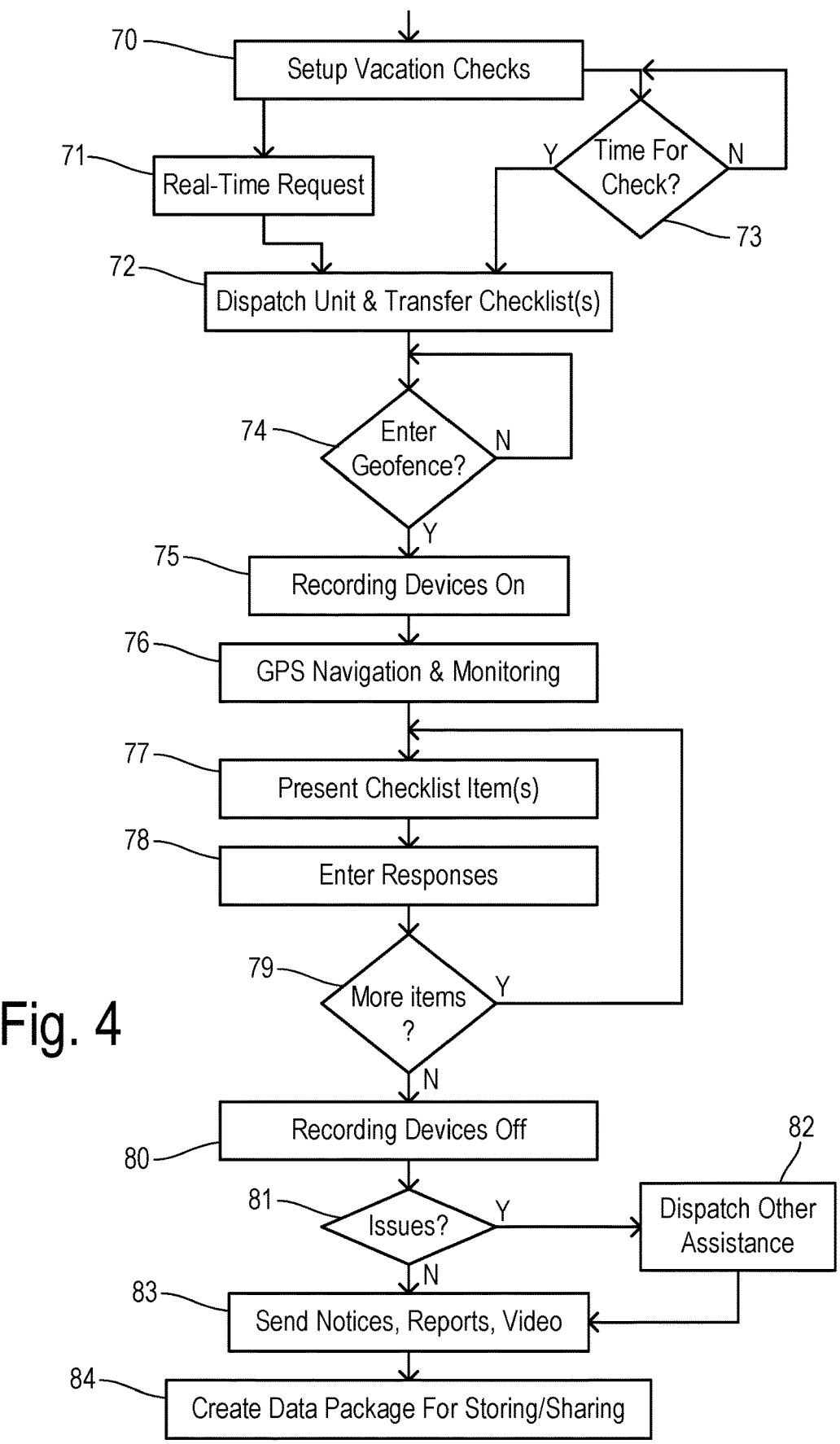
FIG. 4 is a flowchart showing one preferred method of the invention.

FIG. 4 is a flowchart showing a method wherein Vacation Checks are set up in step 70. In some instances, there may be a request in step 71 at the time of setup for a vacation check to be performed in real time (i.e., as soon as possible), resulting in immediate dispatch of an inspection unit and the transfer of a checklist to a patrol unit in step 72. In other instances, a vacation check may be set up for future performance at a specified time, and a check is performed in step 73 to determine when an appropriate time for performing a check has been reached. Once a particular patrol unit has been dispatched for a vacation check, geographic coordinates of the patrol unit are monitored. A check is performed in step 74 to determine whether the patrol unit has entered a geofence location surrounding the desired target dwelling. Once the geofenced location has been entered, recording devices are turned on in step 75 (e.g., by activating an onboard vehicle camera or body cam either continuously or on and off at selected times while the patrol car or officer are at particular geographic coordinates). In step 76, the geographic coordinates are continuously monitored for the patrol car and the officer. GPS navigation may also be performed for an autonomously-driven patrol car in the event that the patrol car can be dispatched to various locations around the target dwelling for capturing video (e.g., during times when the officer exits the vehicle to perform various inspection items on foot). According to the tracked movement of the officer or in response to manual indications made by the officer on the mobile device when various checklist items are completed, checklist prompts are provided in step 77 which step the officer or patrol car through the various checklist items. Officer responses may be entered in step 78, and then a check is performed in step 79 to determine whether there are any more inspection items to be retrieved from the checklist(s). If so then a return is made to step 77. Otherwise, recording devices are turned off in step 80. In step 81 a check is performed to determine whether any reportable issues have been detected, if so then other assistance may be dispatched to the target dwelling in step 82. If there are no issues (or after dispatching other assistance), notices, reports, and/or video data are compiled and sent to the user in step 83. In step 84, the onboard controller and/or the management server create a data package for storing and/or distribution in step 84.

Figure 5:
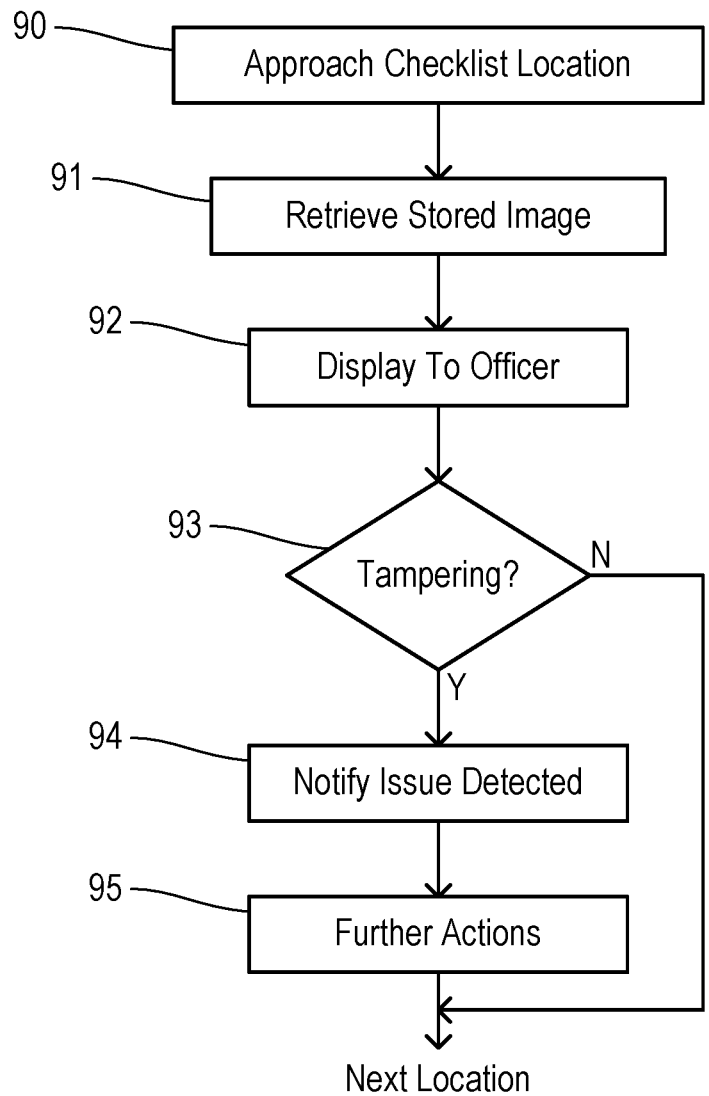
FIG. 5 is a flowchart showing further details of an inspection method conducted at an individual checklist location.

FIG. 5 shows a flowchart a portion of the method in greater detail relating to the handling of each inspection item on an officer's checklist. In step 90, the officer responds to a checklist prompt identifying a particular item (e.g., a door or a window) by approaching the corresponding location. The checklist prompt may include walking directions to assist the officer in finding the correct location. In order to help identify any changes in the state of an inspection item, the original setup may include the provision of a baseline image of the item which is retrieved in step 91. The baseline image may show a door or window in its desired state (e.g., undamaged and locked). The baseline image is displayed to the officer in step 92 during the current inspection of the corresponding inspection item so that the officer can make a visual comparison. The officer checks for tampering in step 93. If tampering is not detected then the method moves onto a checklist prompt for the next location, if any. If tampering is detected, then a notification that an issue has been detected is sent in step 94. The notification can be sent to the management server for handling or can be sent to the user. Further actions may be taken in step 95 such as a call for backup or the forwarding of a request for an access code if the officer wants to obtain passage through a locked door in order to investigate a potential breach.

The foregoing has demonstrated an on-demand security inspection system that maximizes the utility to the user of a Vacation Check while providing a system that is easy to use and efficient for the investigator (e.g., officer) to perform. Once the officer arrives at the location, the user (homeowner) can be alerted and the officer will increment through the checklist one step at a time. As soon as the vehicle enters the geofenced area of the target property, both the vehicle sensors and officer body camera/mic will turn on and start recording. The recordings can be made available real time to the user to facilitate real time communication if needed, and they can be stored for future reference. Other sensors on the officer and/or vehicle can also be enabled at this time. The patrol vehicle may use V2V communication with a management server and mobile devices carried by the officer. The V2V communication together with an Internet connection can be used to take advantage of the user's smart home capabilities so that a specific door can be unlocked if an interior check is to be performed (or to place mail and packages inside the house).

The officer follows the checklist to complete each item listed (e.g., investigating around the house, surrounding property, and parked vehicles). As the officer inspects an area, they can interact with their body cam and/or mobile smartphone to mark a location as secure (i.e., "no issue") and continue onto the next location or item. Each checklist item may be tagged with a GPS reference location. The officer's location can be tracked in case an incident occurs, backup is needed, or the responding officer needs to identify the location where a response is needed. As the officer encounters unusual conditions, the user can be pinged and/or an incident report generated to document damage, document a potential crime, or coordinate repairs.

At the same time, the patrol vehicle can drive around and inspect the dwelling from the driveway or off-road areas (if allowed and/or it is a large property). In the checklist defined by the user and communicated to the vehicle, the user may identify areas for scanned with a vehicle sensor suite (e.g., radar, cameras, LIDAR). From the initial check to subsequent checks in the future, the patrol vehicle and/or officer can identify any differences or damage observable from the vehicle data using image recognition and machine learning to identify paint discolorations, dents, or broken windows, for example. If damage is determined to have occurred, the officer may investigate further and can alert the homeowner if necessary. The vehicle can turn on lights to illuminate walking paths for the officer and to illuminate areas corresponding to checklist inspection items in order to provide light to ensure clarity of images (e.g., if the check is performed at night).

Once the check is complete, the user may be provided with video footage from both the vehicle and the officer(s) regarding the Vacation Check. Notices may be provided of the completion of the check, or of the bringing in of mail or packages into the dwelling (e.g., the user's house or vehicle at the requested location.

What is claimed is:

1. An on-demand security inspection system for dispatching an investigator to a target dwelling, wherein the investigator carries a video camera, comprising:
   a service management server;

a requestor interface configured to link a user to the service management server in order to specify a checklist of inspection items each at respective geographic coordinates;

a mobile unit used by the investigator, wherein the mobile unit detects geographic coordinates of the investigator; and an investigator interface configured to link the mobile unit to the service management server in order to (1) communicate a plurality of checklist prompts to the mobile unit according to the reported geographic coordinates of the mobile unit, and (2) return video data corresponding to respective geographic coordinates from the video camera captured according to the checklist prompts to the service management server;

wherein the video camera is worn by the investigator, wherein the mobile unit is comprised of a controller module mounted in a vehicle, wherein the vehicle includes a vehicle-mounted imager, wherein the service management server and the requestor interface are configured for specifying a vehicle checklist and an investigator checklist, wherein the vehicle checklist is comprised of first inspection items performed autonomously by the vehicle using the vehicle-mounted imager, and wherein the investigator checklist is comprised of second inspection items performed by the investigator using the video camera.

2. The system of claim 1 wherein the video camera is worn by the investigator, and wherein an activation command is transmitted to the video camera before a predetermined checklist prompt.

3. The system of claim 2 wherein a deactivation command is transmitted to the video camera when the checklist is completed.

4. The system of claim 1 wherein the mobile unit comprises a global positioning system (GPS) receiver determining the geographic coordinates, wherein one or more checklist prompts are triggered according to the geographic coordinates from the GPS receiver.

5. The system of claim 1 wherein the mobile unit is comprised of a vehicle-mounted controller module, and wherein the system further comprises:

a handheld unit communicating with the mobile unit and configured to present an interface to the investigator for (A) listing the checklist prompts and (B) indicating investigator responses indicating a status corresponding to the checklist prompts.

6. The system of claim 1 wherein the service management server is configured to stream the video data to the user via the requestor interface.

7. The system of claim 1 wherein the video data is formatted into a video package with the investigator responses, and wherein the video package is stored by the service management server for on-demand retrieval.

8. The system of claim 1 wherein the investigator interface and the requestor interface are configured to exchange a request from the investigator and a response from the user pertaining to an access code usable to gain entrance to the target dwelling.

9. The system of claim 1 wherein the service management server communicates a still picture of a specific location at one of the checklist prompts to the mobile unit, wherein the mobile unit compares the still picture to the video data to detect potential issues using artificial intelligence; and wherein the mobile unit communicates a detected potential issue to the service management server.

10. A method for performing an on-demand security inspection system of a target dwelling, comprising the steps of:

a user generating a service request which specifies the target dwelling, an inspection time, and a checklist comprised of inspection items each at respective geographic coordinates to be performed by an investigator who carries a video camera and a geographic location device;

dispatching the investigator to the target dwelling according to the inspection time, wherein the investigator carries a video camera;

detecting geographic coordinates of the investigator at the target dwelling using the geographic location device;

communicating a plurality of checklist prompts to a mobile unit associated with the investigator, wherein the checklist prompts serially present the inspection items in response to respective geographic coordinates; and returning video data corresponding to respective geographic coordinates from the video camera captured according to the checklist prompts;

wherein the video camera is worn by the investigator, wherein the mobile unit is comprised of a controller module mounted in a vehicle, wherein the vehicle includes a vehicle-mounted imager, wherein the service request from the user specifies a vehicle checklist and an investigator checklist, wherein the vehicle checklist is comprised of first inspection items performed autonomously by the vehicle using the vehicle-mounted imager, and wherein the investigator checklist is comprised of second inspection items performed by the investigator using the video camera.

11. The method of claim 10 wherein the video camera is worn by the investigator, and wherein the method further comprises the step of:

transmitting an activation command to the video camera before a predetermined one of the checklist prompts.

12. The method of claim 11 further comprising the step of transmitting a deactivation command to the video camera when the checklist is completed.

13. The method of claim 10 wherein the investigator carries a global positioning system (GPS) receiver determining the geographic coordinates, and wherein one or more checklist prompts are triggered according to geographic coordinates from the GPS receiver.

14. The method of claim 10 wherein the mobile unit is comprised of a vehicle-mounted controller module, wherein the investigator carries a handheld unit communicating with the mobile unit, and wherein the method further comprises the steps of listing the checklist prompts on an interface presented to the investigator on the handheld unit; and entering investigator responses to the interface indicating a status corresponding to the checklist prompts.

15. The method of claim 10 further comprising the step of live streaming the video data to the user.

16. The method of claim 10 further comprising the step of formatting the video data into a video package with the investigator responses, wherein the video package is stored by a service management server for on-demand retrieval.

17. The method of claim 10 further comprising the steps of:

transmitting a request from the investigator to the user for an access code usable to gain entrance to the target dwelling; and transmitting a response from the user to the investigator revealing the access code.

18. The method of claim 10 further comprising the steps of:
communicating a still picture of a specific location at one of the checklist prompts to the mobile unit;
comparing the still picture to the video data to detect potential issues using artificial intelligence; and
communicating a detected potential issue to the user.

* * * * *